Figure 1:
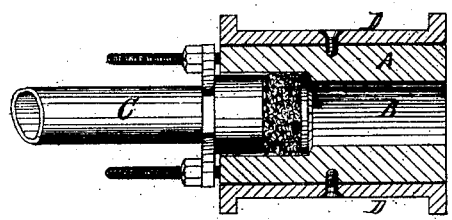
Figure 2:
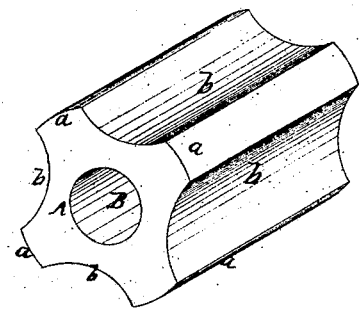

T. Hill,

Oscillating Engine.

No. 108,136. Patented Oct. 11. 1870.

Witnesses.
Geo. H. Strong
Wm R. Boone

Inventor.
Thomas Hill

United States Patent Office.

THOMAS HILL, OF VALLEJO, CALIFORNIA.

Letters Patent No. 108,136, dated October 11, 1870.

IMPROVEMENT IN TRUNNIONS FOR STEAM-ENGINES AND CALENDERS.

The Schedule referred to in these Letters Patent and making part of the same.

*To all whom it may concern:*

Be it known that I, THOMAS HILL, of Vallejo, county of Solano, State of California, have invented an Improved Trimmer for Steam-Engines and Calenders; and I do hereby declare the following description and accompanying drawing are sufficient to enable any person skilled in the art or science to which it most nearly appertains to make and use my said invention or improvements, without further invention or experiment.

My invention relates to an improvement in the trunnions used for oscillating engines, and for drying-calenders.

In this class of machinery the steam is passed through some form of steam-tight joint to the engine or calender, as the case may be.

In the first case, the movement on the supporting-trunnions is vibratory, and in the calender they revolve continuously; but in both they soon become worn, and must eventually be replaced.

To lessen the expense and time in such renewal, I construct the inner part of my trunnion, in which the joint is made, and through which the steam passes, so that an end view shows a cross or star with blunt points, which are accurately turned.

A sleeve is fitted on over these points, and upon the outside of this falls the friction and wear.

A further advantage is derived from the circulation of air through the spaces between the points or ends on which the sleeve rests, this keeping the bearing comparatively cool. When too much worn, the sleeve can be replaced in a short time.

Referring to the accompanying drawing for a more complete explanation of my invention—

A is a trunnion, which may be employed on an oscillating engine, a steam drying-calender, or in any place where it is necessary to have a joint through a movable bearing or journal.

A hole, B, is made through this trunnion for the passage of steam, which is brought to it by the pipe C, which enters the hole B, and is packed, as shown, so as to be steam-tight.

The trunnion is made with four or more projecting ends, *a a*, with corresponding spaces or depressions *b* between them. These ends *a* are turned off in a lathe, and a sleeve, B, is fitted to slide on over them. This sleeve is made fast to the arms, and is turned smooth on the outside, to form a journal which turns in suitable bearings.

Whenever this sleeve becomes worn, it can be removed, and a new one substituted, with but little delay to the engine, the cylinders of which would have to come out with the ordinary trunnions.

The spaces B allow a free circulation of air about the trunnion, either naturally or by blast, so that the journal is kept cool and will work better.

Having thus described my invention,

What I claim, and desire to secure by Letters Patent, is—

The combination, with a trunnion, A, provided with arms *a* and spaces *b*, of the sleeve B, substantially as and for the purpose specified.

In witness that the above-described invention is claimed by me, I have hereunto set my hand and seal.

THOMAS HILL. [L. S.]

Witnesses:
   GEO. H. STRONG,
   WM. R. BOONE.